United States Patent
Baum

(10) Patent No.: US 7,843,923 B2
(45) Date of Patent: Nov. 30, 2010

(54) METHODS AND APPARATUS FOR DETERMINING THE PORT AND/OR PHYSICAL LOCATION OF AN IP DEVICE AND FOR USING THAT INFORMATION

(75) Inventor: Robert T. Baum, Gaithersburg, MD (US)

(73) Assignee: Verizon Services Corp., Ashburn, VA (US)

(*) Notice: Subject to any disclaimer, the term of this patent is extended or adjusted under 35 U.S.C. 154(b) by 1818 days.

(21) Appl. No.: 10/337,106

(22) Filed: Jan. 6, 2003

(65) Prior Publication Data

US 2003/0133450 A1    Jul. 17, 2003

Related U.S. Application Data

(60) Provisional application No. 60/346,596, filed on Jan. 8, 2002.

(51) Int. Cl.
*H04L 12/28* (2006.01)
*H04L 12/56* (2006.01)

(52) U.S. Cl. ........................... 370/392; 370/401
(58) Field of Classification Search ............ None
See application file for complete search history.

(56) References Cited

U.S. PATENT DOCUMENTS

| | | | |
|---|---|---|---|
| 5,109,406 A * | 4/1992 | Mano et al. | 379/93.14 |
| 6,012,088 A | 1/2000 | Li et al. | |
| 6,069,890 A * | 5/2000 | White et al. | 370/352 |
| 6,134,315 A | 10/2000 | Galvin | |
| 6,298,130 B1 | 10/2001 | Galvin | |
| 6,307,920 B1 | 10/2001 | Thomson et al. | |
| 6,335,927 B1 | 1/2002 | Elliott et al. | |
| 6,345,095 B1 | 2/2002 | Yamartino | |
| 6,363,065 B1 * | 3/2002 | Thornton et al. | 370/352 |
| 6,393,484 B1 | 5/2002 | Massarani | |
| 6,678,265 B1 | 1/2004 | Kung et al. | |
| 6,680,998 B1 | 1/2004 | Bell et al. | |
| 6,684,250 B2 | 1/2004 | Anderson et al. | |
| 6,738,808 B1 | 5/2004 | Zellner et al. | |
| 6,839,323 B1 | 1/2005 | Foti | |
| 6,856,676 B1 | 2/2005 | Pirot et al. | |
| 6,925,076 B1 * | 8/2005 | Dalgic et al. | 370/356 |
| 6,940,866 B1 | 9/2005 | Miller et al. | |
| 6,975,587 B1 | 12/2005 | Adamski et al. | |
| 7,007,080 B2 * | 2/2006 | Wilson | 709/221 |
| 7,039,721 B1 | 5/2006 | Wu et al. | |
| 7,072,346 B2 | 7/2006 | Hama | |
| 7,184,418 B1 | 2/2007 | Baba et al. | |

(Continued)

*Primary Examiner*—Warner Wong

(57) ABSTRACT

Methods and apparatus for providing location and other customer information corresponding to an IP addresses, including dynamically assigned IP address, are described. A port of an edge router is assigned to serve as a customer's point of access to an IP based network. Customer information including the location of the customer premises from which the IP network is accessed through the assigned edge router port is stored in a database associating edge router and port information with customer information. When information about a customer using an IP address is desired a database associating IP addresses with edge routers, e.g., edge which acted as proxies to facilitate IP address leasing is consulted. The edge router corresponding to the IP address of interest is then contacted to determine the port number associated with the IP address. Recovered edge router and port number information is then used to access the customer information database.

26 Claims, 10 Drawing Sheets

U.S. PATENT DOCUMENTS

| | | |
|---|---|---|
| 7,197,549 B1 | 3/2007 | Salama et al. |
| 7,203,187 B1 * | 4/2007 | Richardson et al. ......... 370/352 |
| 7,320,070 B2 | 1/2008 | Baum |
| 7,359,368 B1 * | 4/2008 | Pearce ....................... 370/352 |
| 2001/0040885 A1 * | 11/2001 | Jonas et al. ................. 370/352 |
| 2002/0021675 A1 | 2/2002 | Feldman |
| 2002/0054667 A1 | 5/2002 | Martinez |
| 2002/0057764 A1 | 5/2002 | Salvucci et al. |
| 2002/0101860 A1 * | 8/2002 | Thornton et al. ............ 370/352 |
| 2002/0136361 A1 | 9/2002 | Stumer |
| 2002/0165835 A1 | 11/2002 | Igval |
| 2003/0063714 A1 | 4/2003 | Stumer et al. |
| 2003/0147518 A1 * | 8/2003 | Albal et al. ............ 379/207.15 |
| 2003/0161335 A1 | 8/2003 | Fransdonk |
| 2003/0185361 A1 | 10/2003 | Edwards |
| 2003/0187986 A1 | 10/2003 | Sundqvist et al. |
| 2004/0190497 A1 | 9/2004 | Knox |
| 2004/0202171 A1 | 10/2004 | Hama |
| 2004/0249975 A1 | 12/2004 | Tuck et al. |

* cited by examiner though they are shown as part of the same table. The resulting tables are then used by the edge routers to determine the destination of packets.

METHODS AND APPARATUS FOR DETERMINING THE PORT AND/OR PHYSICAL LOCATION OF AN IP DEVICE AND FOR USING THAT INFORMATION

RELATED APPLICATIONS

The present invention claims the benefit of U.S. Provisional Patent Application Ser. No. 60/346,596, filed on Jan. 8, 2002 which bears the same title as the present application and which is hereby expressly incorporated by reference.

FIELD OF THE INVENTION

The present invention is directed to methods and apparatus for determining a port and/or physical location associated with an IP device and for using that information.

BACKGROUND OF THE INVENTION

Digital communications networks have continued to grow in importance as people have come to rely on the electronic exchange of information to support both business and personal pursuits. E-mail, the electronic transfer of files, and various other services are all made possible by the use of digital communications networks.

The type of digital communications network employed often depends on the size of the network to be implemented, as well as the needs and capabilities of the party or parties implementing the network. Hardware cost and network management complexity are often a factor when choosing the type of network to be implemented.

Networks limited to a small geographical region, e.g., home or single office location, are frequently called local area networks ("LANs"). LANs are often privately-owned networks within a single building or small campus. LANS are widely used to connect personal computers and workstations at a single location, e.g., company office or residence, to one another and to shared resources such as printers and/or local centralized file storage. One popular type of LAN, an IEEE 802.3 standard based LAN is popularly called Ethernet. Ethernet is a bus based broadcast network with decentralized control. When using Ethernet, data, e.g., messages, information and signals are transmitted in Ethernet using frames. Ethernet devices broadcast and receive frames over the shared bus over which the frames are broadcast. The format of an IEEE 802.3 frame 100 is shown in FIG. 1. Each frame 100 starts with a 7 byte preamble 102 containing a preset bit pattern. The preamble 102 is followed by a start of frame byte 104 which includes the bit pattern 10101011 used to denote the start of the frame. Next comes two addresses, a destination address 106 and a source address 108. The high-order bit of the destination address is a 0 for ordinary addresses and 1 for group addresses. Group addresses, in contrast to individual device addresses, allow multiple stations, e.g., devices coupled to the Ethernet, to receive frames including a single group address. When a frame is sent to a group address, all the stations in the group receive it. Sending to a group of stations is called a multicast. The address consisting of all 1 bits is reserved for broadcast. A frame containing all 1s in the destination field, indicating a broadcast, is delivered to all stations on the network.

Six byte global Media Access Control (MAC) Ethernet device addresses are assigned by a central authority to ensure that no two stations anywhere in the world have the same global address. Manufacturers of Ethernet devices, e.g., networking boards, request a block of addresses from the central authority to assure that no two Ethernet boards are assigned the same global MAC address. The boards then send and receive frames based on the 48-bit MAC address programmed into the board by the manufacturer. Because source MAC address information is inserted into Ethernet frames by the Ethernet boards, the source address 108 in an Ethernet frame is usually accurate and is difficult to fake.

Since Ethernet MAC address are globally unique, any device can address any other device by just using the right 48 bit MAC address assigned to the device being addressed.

MAC addresses are data link layer addresses. The data link layer corresponds to the second layer of the seven layer OSI (Open Systems Interconnection) Reference Model. As a result, Ethernet LANs and other LANS which use data link layer addresses are sometimes called Layer 2 networks.

In addition to the address information 106, 108 the Ethernet frame includes a length of data field 110, data field 112, padding field 114 and a checksum field 116. As will be discussed below, information intended to be transmitted over an IP based network may be included in the data field 112.

While Layer 2 networks are well suited for implementing LANs, e.g., at relatively small sites, it is often desirable to connect devices, e.g., computers located on different LANs. Layer 3 networks, which rely on network protocols, e.g. TCP/IP protocols, are often used for interconnecting Layer 2 networks. Layer 3 packets, e.g., IP packets, are often encapsulated in Layer 2 frames to extend the reach of the Layer 3 network to host devices on the Layer 2 network. This permits Layer 2 signaling and frames to be used for transmissions of data over the Ethernet while preserving Layer 3 addressing information for transmission over the Layer 3 network. The network resulting from interconnecting one or more Layer 2 and Layer 3 networks is often referred to as an internet.

The Internet is a well known worldwide internet that is used to connect computers and other devices located at universities, governments offices, businesses and individuals together.

FIG. 2 is an extremely simplistic representation of the Internet 200. As illustrated, the Internet 200 includes a plurality, e.g., first and second, Layer 2 networks 201, 203, coupled together by a Layer 3 network 205. While only two Layer 2 networks, e.g., Ethernet LANs, are shown, many thousands of such networks may be part of the Internet. Edge routers, e.g., multi-protocol routers, capable of converting between Layer 2 and Layer 3 formats and addressing schemes, are often used to connect Layer 2 networks to Layer 3 networks. In FIG. 2, first edge router 216 connects the first Layer 2 network 201 to the Layer 3 network 205. Similarly the second edge router 218 connects the second Layer 2 network 203 to the Layer 3 network 205.

In the FIG. 2 example, two host devices 208, 210 are shown coupled to the first Ethernet bus 204, used to implement the Ethernet LAN 201, while third and fourth host devices 212, 214 are shown coupled to the second Ethernet bus 206 used to implement Ethernet LAN 203. While only two hosts are shown on each Ethernet LAN it is to be understood that a large number of hosts may be coupled to any one of the Layer 2 networks, corresponding to Ethernet busses 204, 206, at any given time.

Routers, serve as forwarding devices and, optionally, protocol conversion devices. In the FIG. 2 diagram, edge routers 216 and 218 have the capability of converting between Ethernet frames and IP packets, and vice versa, using one or more tables relating IP addresses to MAC addresses.

Routers 222, 224, 226 and 228 internal to the Layer 3 network form part of what is sometimes called the Internet backbone. Since these routers do not need to handle Ethernet frames, they do not include the protocol conversion functionality present in the edge routers 216, 218. A group of routers 216, 218, 222, 224, 226, 228 managed by a single administrator is often called an Autonomous System (AS). The Internet includes several AS which are connected to each other. Each AS may include one or more DHCP (Dynamic Host Configuration Protocol) servers which are responsible for assigning IP addresses to host devices connected to the AS. In FIG. 2, a single DHCP server 220 is shown coupled to edge routers 216, 218.

Unlike LANs which use data link layer addresses, the Internet uses Layer 3 (Network layer) addresses, e.g., IP Addresses, for purposes of identifying source and destination devices and determining the appropriate route upon which packets should be transmitted.

Source and destination IP addresses are included, along with data, in IP packets used to transmit information across the Internet. Every host and router on the Internet has an IP address which encodes its IP network number and host number. The combination is unique; no two machines have the same IP address.

All IP addresses are 32 bits long and are used in the Source address and Destination address fields of IP packets. FIG. 3 is a diagram 300 which illustrates the standard 32 bit format for IP addresses. Note that host addresses are divided into different classes (A, B, C) with different numbers of bits allocated to the network number and host portion number in each address class. From a management perspective, system administrators may divide the host number portion of a 32 bit IP address into a subnet portion 402 and a host portion 404 as illustrated in block 400 of FIG. 4. In such embodiments, within the network defined by the network portion of the IP address, a subnet mask is used at the routers within the network to distinguish between the host portion 404 and the rest of the 32 bit IP address and thereby allow for routing within the network based on the subnet portion of the address.

The demand for IP addresses continues to grow and, with fewer bits than are used for MAC addresses, there are considerably fewer IP addresses available for allocation. Given the demand for IP addresses and the limited supply, IP addresses are leased from a central authority responsible for overseeing their allocation. Internet service providers, may lease a large number, e.g., a block of IP addresses, which the provider then sub-leases to end users, e.g., host devices.

As a result of the lease (actually the sub-lease) process, end users obtain an IP address which is subject to lease restrictions including the right to use the IP address for a limited period of time. IP addresses leased for extended periods of time, e.g., a year or more, are often termed "static" IP addresses. Static IP addresses are used for applications such as Web site hosting where the Internet connection is likely to remain active and in use for extended periods of time. Users normally pay a premium for static IP addresses.

With regard to individual Internet users, IP addresses are more commonly leased to end users on a dynamic basis. Internet service providers frequently use a DHCP server to assign users IP addresses for a limited lease time when they seek to access the Internet, e.g., from a host device coupled to the Internet by way of a Layer 2 network. FIG. 2 illustrates a single DHCP server 220 coupled to the two edge routes 216, 218 to oversee IP address allocation. In practice, the Layer 3 network 205 may include multiple DHCP servers with each server being responsible for allocating IP addresses to users on a different network or subnet. The system administrator responsible for overseeing an AS determines the relationship between DHCP servers, sets of IP addresses allocated by each of the DHCP servers and the edge routers which connect users to the DHCP servers for IP address assignment.

Once an IP address is leased to a host, e.g., user, if the host remains active beyond the lease term, the lease may be extended or a new IP address assigned to the host from the available pool of IP addresses at the end of the first lease term.

When a user intends to stop using the IP address, the user's device, e.g., host device 208, normally signals to the DHCP server that assigned the IP address that the address is being released. This allows the address to be added to the pool of available addresses and reused. In the event that a release message is not received prior to the IP address lease timing out, and the DHCP server encounters a shortage of addresses in the pool of available addresses, the DHCP server may poll devices to which it allocated IP addresses to see if they are still active. Failure to receive a response may result in the DHCP adding the IP address assigned to the non-responding device back into the pool of available IP addresses.

Thus, unlike MAC address which are fixed for the life of a product by the manufacturer, the IP address assigned to a particular host device can change from moment to moment. Accordingly, in contrast to MAC addresses which are fixed for the life of a product by the manufacturer, there is no permanent fixed relationship between a physical device and the IP address assigned to the device.

Many contemplated IP applications could benefit from reliable information about the location and/or identity of a host device using an IP address. The dynamic allocation of IP addresses and re-use of IP addresses discussed above, greatly complicates attempts to accurately correlate specific devices and/or physical locations with an IP address.

The problem of associating IP addresses with physical locations is further complicated by the manner in which IP addresses are assigned and used. Blocks of IP addresses are assigned by the central authority to different network providers based on the size of their networks. Unlike zip codes or telephone number area codes, assignment of IP addresses is independent of geographic location. Accordingly, IP addresses do not inherently convey geographic location information as do, for example, zip codes used by the post office or the area code portion of a telephone number.

Reliable location information is also difficult to obtain in an IP network because IP based routing relies, in most cases, on the intelligence of the network to determine the routing path to a specified destination address. The host need not, and in most cases does not, know the physical location of the destination device to which it is sending packets or the route over which the transmitted packets will be conveyed. In addition, routers in an IP network usually only need to determine the next router in a path based on an IP address and therefore often do not include detailed topology information relating to large portions of an IP network. While shielding end devices and routers from having to make end to end routing decisions has many advantages, the lack of information about the physical devices corresponding to IP addresses poses problems in many contemplated IP based applications.

IP based services, those based on private internets and the larger Internet are continuing to grow in importance. IP and the Internet are beginning to be used for a wide range of applications such as music file sharing, news delivery, software distribution, etc. IP and Internet applications which are expected to grow in importance in the future include Internet telephony and video on demand services. In the case of Internet telephony voice signals are exchanged over the Internet through the use of packets including voice data. In the case of video on demand (VoD) services, video in the form of digital files transmitted as packets, is supplied to a customer using the Internet as the transport mechanism.

In many cases, it would be useful if the physical location of a device using an IP address could be determined from its IP address. For example, in the case of IP telephony calls to the emergency 911 it would be beneficial to be able to determine the location of the IP telephony device making the call so that rescue workers could be dispatched to the correct location. In the case of detected hacking attempts it would be desirable to be able to determine from the hacker's IP address the location from which the hacker was operating.

In view of the above discussion, there is a need for methods and apparatus for determining the location, identity, and/or other information about a party or device using an IP address at any specific point in time.

SUMMARY OF THE INVENTION

IP devices which are intended to work with LANs, e.g., Ethernet LANs, are assigned MAC addresses at the time of manufacture. The MAC addresses are normally programmed into the device hardware making them difficult to falsify. IP devices, e.g. voice over IP phones, network interface cards, etc, are connected to an IP network by way of a physical port of an edge router.

An IP edge router includes information, e.g., one or more address tables, associating a device's MAC address with a physical port. In addition, when an IP address has been assigned for a MAC address, the edge router also includes information associating the assigned IP address to the specific MAC address for which the IP address was assigned. A DNS DHCP (Domain Name Server Dynamic Host Protocol) device normally provides the IP address assignment function. Accordingly, the edge router includes information associating a device's MAC address with the physical router port used to connect the device to the edge router and any assigned IP address.

In accordance with the present invention, a secure network is also coupled to the edge router. The secure network is used, in accordance with the invention, to query the edge router for information associating a specific network transaction, as identified by an IP or MAC address, with a physical port. The MAC and/or IP address used to identify the transaction will correspond to a particular physical device, e.g., IP telephone, coupled to the port either directly or by way of a LAN. In accordance with the invention, the retrieved port information is used to provide a wide variety of control functions and/or services.

One particular control function involves limiting access to particular IP based services based on port information. For example, IP over video services could be provided to devices coupled to a particular physical port corresponding to one subscriber residence while being denied to another network user using a different port. This port identification based technique to limiting services avoids the need to register with a central gatekeeper and to include registration software and/or hardware in devices such as IP based video conferencing equipment. The port to which particular services are limited may correspond to a wired or wireless LAN. Accordingly, services can be limited to particular ports whether or not such ports correspond to specific physical premises or locations.

The physical port of an edge router used to provide a device connectivity to an IP network, such as the Internet, can be determined, e.g., using the techniques discussed in regard to invention 1.

In accordance with the present invention, the IP service provider maintains a table associating particular edge router ports with physical locations serviced by those ports.

In the case where an identified port of an edge router is connected to a wired LAN or wireless LAN limited to a small geographic region, e.g., a single office, residence, or other known physical location, the identified port can be correlated to the physical location to which it is connected, e.g., through a simple look-up table operation. This is similar to associating a particular POTS telephone line to a specific business location or residence. Since the port connection is controlled by service provider, the location information associated with the port connection will tend to be relatively reliable and difficult to falsify.

Thus, through an edge router port to physical location look-up operation, performed in accordance with the present invention, the location of an IP device can be determined with reasonable certainty. Device location information obtained in accordance with the present invention may be used to locate stolen devices which are coupled to the IP network, to verify the location of, e.g., prisoners required to use IP based monitoring devices, etc.

LANs tend to be relatively limited geographically, e.g., to a single office or floor of a building. The offices and/or buildings are sometimes referred to as customer premises since the office and/or building is the premise of a communications customer, e.g., an IP service subscriber.

As discussed above, there are a large number of applications where it would be beneficial to be able to identify the physical location and/or the physical device using an IP address at any given time. For example, if an IP telephony call was being placed, it might be desirable to be able to determine the physical location from which the call was placed, e.g., for 911 emergency call purposes. In addition, for security purposes it might be desirable for certain applications to limit access via an IP network to devices located at a particular physical location, e.g., a manager's home residence thereby blocking hackers operating from different physical locations. Also, in terms of providing services, e.g., music over IP services, it might be desirable to license a particular physical site, e.g., home location, but not others.

Given this, reasonably accurate geographic information can be obtained by correlating a user to the location of a LAN being used to couple a user's host device to a private internet or the Internet.

In accordance with one feature of the present invention each IP service subscriber, e.g., individual and/or company seeking to obtain access to an IP based network from a physical location, e.g., customer premise, is assigned to an edge router port to which they can connect to obtain access to the IP based network, e.g., corporate internet or the Internet. Thus, from a particular physical site (customer premise), an individual machine or a plurality of machines on a LAN, e.g., Layer 2 network, can access the Internet via the particular edge router port assigned to service the customer premise. Individual customers and/or companies with multiple distinct locations e.g., different customer premises, are assigned different edge router ports for each distinct physical location. Thus, each edge router port assigned to a customer in accordance with the invention will correspond to a single physical location.

In accordance with the present invention, information associating an edge router port with the physical location from which devices can connect to the router port is stored in a database, e.g., a router-port to location/customer (RPLC) information database. Thus, the RPLC information database associates customer premise information with router and port information. In addition to the location information, customer name and/or other contact information, e.g., the number of a telephone located at a listed customer premise, may also be included for each entry in the RPLC database.

In this manner, a database somewhat similar to a line information database (LIDB) used for telephone caller ID purposes, is constructed using edge router and port information, as opposed to telephone numbers, to identify customer premises.

For convenience, the RPLC database associating edge router ports with customer information e.g., location and contact information may be located in a network element such as a location and customer information server (LCIS).

Unfortunately, unlike telephone numbers, IP addresses used by devices coupled to a specific router port may change frequently as a result of dynamic IP address assignment. In addition, unlike telephone numbers which are available from control information transmitted with most telephone calls, edge router/port identification information corresponding to a specific IP address identified in an IP packet is usually not readily available from transmitted IP packets.

In addition to the RPLC database, a system implementing the present invention includes one or more databases (IP2ER databases) that correlate IP addresses to edge routers. Each IP2ER database includes a list of IP addresses and information identifying the edge router, which is the IP network ingress and/or egress edge router, for the host device assigned to use the listed IP address. IP2ER databases may be implemented in each LCIS or may be located elsewhere in the network, e.g., in the DHCP servers responsible for allocating IP addresses for individual networks. As a practical matter, each individual IP2ER database may include information for a subset of Internet addresses, i.e., the addresses for which a DHCP server is authorized to allocate. In such embodiments, the LCIS stores information indicating the IP2ER database which includes information for different sets of IP addresses. For example, the LCIS may store information associating the network portion of an Internet address with a particular DHCP server which includes the IP2ER database for the host devices on the particular network.

In the case of a DHCP server embodiment, in addition to including IP to edge router information, the DHCP server normally includes information associating a MAC address with an IP address.

When a device, e.g., an access control server, soft switch or other device wants information about a customer or physical location corresponding to an IP address, it sends the IP address to the LCIS server of the present invention as part of an IP2ER look-up request. The LCIS determines from an IP2ER database the edge router which serves as the IP network ingress and/or egress router for the supplied IP address. When available, the MAC address corresponding to an IP address may be supplied with the edge router information in response to an IP2ER database look-up request.

Using the edge router information obtained from the IP2ER look-up operation, the LCIS requests from the identified edge router port number information corresponding to the IP address of interest and/or MAC address obtained from the IP2ER look-up operation. The edge router accesses its routing tables and returns the requested port number information to the LCIS.

Using the edge router and port number corresponding to the IP address of interest, the LCIS then accesses the RPLC database and returns the information, e.g., location, customer name and/or other information, stored in the record corresponding to the edge router and port number determined to correspond to the IP address of interest.

From a security standpoint, the LCIS may be implemented as part of a management network which is separate from, but coupled to the DHCP servers and edge routers which form part of the Internet. Alternatively, communications between the LCIS and various network elements such as the DHCP servers may be protected using encryption.

One particularly relevant and important application for the IP device location capability of the present invention is supporting location identification capability for 911 calls placed using an IP telephone device.

Unfortunately, there is currently no simple way to convey location information to a 911 operator from an IP network. Accordingly, not only does determining the originating location of an IP call present problems but conveying such location information to an operator along with an IP based 911 call is particularly challenging.

In the case of existing 911 service, calling party telephone number information is forwarded over the PSTN to a 911 call center. The calling party telephone number is used to access a 911 database which correlates the calling party's telephone number to a location programmed into the 911 database. Entries in the 911 telephone number/location database are updated infrequently. Usually the information for a specific telephone number is entered at the time the telephone number is assigned and frequently remains unmodified until telephone service for the particular number is discontinued. For the most part, there is no easy way to frequently update the contents of the 911 location database to reflect a phone, e.g., an IP phone, being moved from location to location.

IP phones register with a soft switch which stores information associating the IP phones telephone number with an IP address. The IP address assigned to a phone may vary at any specific point in time, e.g., depending on factors including which router port is used to couple the phone to the IP network. Since IP addresses can be assigned dynamically, each time an IP phone is reconnected to the IP network, it updates the IP address information associated with its assigned telephone. Calls are then directed based on the updated IP address.

As a result of the soft switch registration process calls to an IP telephone number may be routed to different locations at different times. Accordingly, an IP phone number can not be used to provide accurate location information since the phone number is not tied to a specific location.

In accordance with the present invention, for E-911 purposes, a telephone number is associated with each edge router port associated with a specific location, e.g., office, residence, etc., that may be used to support an IP telephone. The telephone number associated with the edge router port and the corresponding location information is stored in the known 911 location information database.

When the soft switch of the present invention used for routing IP calls detects a telephone call to 911, it determines the edge router port from which the call is made. This can be done using the IP address associated with the calling party's IP telephone and the techniques discussed above. Once the edge router port is identified, the soft switch performs a look-up operation to determine the telephone number associated with the port for 911 purposes. This telephone number, in many cases, will be different from the callers assigned telephone number. The IP based 911 call is then routed to PSTN by an IP to PSTN gateway with the telephone number retrieved from the look-up operation being supplied as the calling party number instead of the actual calling party number. Upon receiving the 911 call, the 911 service center performs an address look-up operation using the supplied calling party number in the normal manner. This results in the address associated with the port from which the IP-based call was placed being supplied to the 911 operator along with the voice portion of the telephone call. Accordingly, without requiring modifications to the existing PSTN portion of the 911 system, operators can be supplied with location information for IP based calls.

Wire tapping of IP based calls presents many challenges. The current inability to wire tap IP based telephone calls has many law enforcement officials concerned given the expected growth in IP telephony over the next few years. In wire tapping applications, the goal is to intercept the communications associated with a particular individual or device for which the wire tap is authorized without interfering with or monitoring the communications of other individuals.

One problem with placing a wire tap on an IP telephone is that it can access an IP network from any one of a plurality of ports. In addition, the access port used at any given time may carry communications corresponding to the IP telephone for which a wire tap is authorized and communications corresponding to other devices for which a wire tap is not authorized.

The present invention presents a method of tapping an IP telephone call without the knowledge of the party being monitored. The techniques of the present invention have the further advantage of allowing an IP telephone call from a specific IP telephone device to be tapped regardless of which port of an IP edge router is used to place or receive the call. It has the additional advantage of allowing the tap to be limited to communications to/from a particular IP telephone thereby avoiding unauthorized monitoring of other communications.

IP telephony devices register with a soft switch used to control IP call routing. The soft switch stores the telephone number of an active IP telephone and the IP address being used by the telephone at any given point in time. Calls directed to an IP telephone are routed by the soft switch based on the stored telephone number and associated IP address information.

In accordance with the present invention, the soft switch is directed to detect calls to/from a wire tapped IP telephone. When a call to/from a telephone number for which a wire tap is activated is detected by the soft switch, the soft switch determines the IP edge router port servicing the IP telephone device, e.g., using the telephone's IP address and edge router port determination techniques discussed in regard to invention 1.

Once the IP edge router and port servicing the IP telephone which is tapped is discovered, the edge router is contacted. The edge router is instructed to implement the wire tap in one of two ways. The first technique is to simply duplicate all IP packets having the IP address associated with the tapped telephone number and to forward them to a designated storage and/or monitoring facility. The second technique is to instruct the edge router to redirect the flow of data through the identified port so that it passes through a network operations center which will duplicate the data packets corresponding to the tapped telephone. The data flows through the network operation center and onto its intended destination through the edge router in a manner that is generally undetectable to the party being monitored.

MAC addresses are used for addressing purposes in Layer 2 networks, e.g., Ethernet LANs, which communicate information using frames. In contrast, IP addresses are used for routing purposes in Layer 3 networks, e.g. IP networks, which communicate information using packets. MAC addresses are assigned by hardware manufactures and are programmed into communications devices at the time of manufacture. The manufacturer assigned MAC address is inserted by the device hardware into the header of each frame generated by the device. As a result, MAC addresses included in the headers of Ethernet frames tend to be reliable. The contents of the data portion of an Ethernet frame are determined by software which can be manipulated with relative ease. Accordingly, MAC addresses included in the data portion of frames are considerable less reliable then the MAC address in the frame header. The MAC address in the data portion of a frame is sometime faked by users seeking to hide their identity, e.g., when seeking an IP address.

In contrast to MAC addresses which are assigned by device manufacturers, IP addresses are frequently assigned to devices on a dynamic basis by DHCP servers.

Edge routers are used to couple Layer 2, e.g., Ethernet LANs, to Layer 3 networks, e.g., IP networks. In order to support routing between the two networks, the edge router includes two tables, e.g., a Layer 2 forwarding table and a Layer 3 to Layer 2 address resolution table. The Layer 2 forwarding table includes information associating router ports with Layer 2 (MAC) addresses. The address resolution table includes information associating IP addresses with MAC addresses.

The Layer 2 forwarding table is normally created from header information received in Ethernet frames. This is done by having the edge router store the MAC address obtained from an Ethernet frame in the Layer 2 forwarding table along with information identifying the port on which the frame including the header was received. Frames subsequently received by the edge router directed to the stored MAC address will be output via the port indicated in the Layer 2 forwarding table. Since the information in the Layer 2 forwarding table is obtained from Ethernet Frame headers it tends to be reliable.

In order to communicate over an IP network, a device on an Ethernet LAN is required to first obtain an IP address. To obtain the IP address, the device sends an IP address request message to an edge router in an Ethernet frame. In response to the request, the edge router populates the Layer 2 forwarding table with the MAC information obtained from the frame's header. In addition, the edge router, acting as a proxy for the requesting device, initiates a DHCP communications session between the DHCP server and the requesting device. As part of the DHCP communications session, the requesting device transmits to the DHCP server a MAC address. The transmitted MAC address, included in the data field of an Ethernet frame, may be faked. The DHCP server will assign an IP address based on the communicated, possibly fake, MAC address. It also stores the assigned IP address, associated MAC address and lease time information in a DHCP server database. The assigned IP address is communicated to the requesting device, along with lease time, e.g., duration, information by way of the edge router.

In existing systems, when an edge router receives an IP address which is not already in its address resolution table, e.g., due to the receipt of a previous message directed to the IP address, it will broadcast an ARP (address resolution protocol) message over the LAN asking for the device which owns the IP address to respond and identify itself. Normally, the device to which the IP address was assigned will respond to the ARP message with its true MAC address. The information from the ARP message response is used to populate the edge router's address resolution table. As a result of the use of ARP and a faked MAC address, the edge router's address resolution table may end up being inconsistent with the DHCP server's database.

In accordance with the present invention ARP is disabled in edge routers. DHCP sessions are snooped by the edge router.

The edge router populates the address resolution table using the MAC and IP addresses obtained from the snooped DHCP session. Lease time information obtained from snooping the DHCP session is used to control aging of the information in the address resolution table, e.g., entries are deleted when their lease time expires. Since the address resolution table is generated by snooping DHCP sessions, faked MAC addresses used to obtain IP addresses will be entered into the address resolution table. The faked MAC address will not match any of the MAC addresses included in Layer 2 forwarding table since the Layer 2 forwarding table is generated from the true MAC addresses obtained from frame headers.

When an address resolution table look-up operation results in a MAC addresses which is not found in the Layer 2 forwarding table, the corresponding IP packet is dropped by the edge router. As a result, devices which obtained IP addresses using fake MAC addresses are denied the receipt of packets directed to the IP address obtained using the fake MAC address.

As an enhanced security feature, before initiating a DHCP session, the edge router, in some embodiments, compares the MAC address in the body of an IP address assignment request message to the MAC address in the header portion of the frame including the request message. If there is a miss-match between the MAC in the header and the body of the frame, a fraudulent attempt at obtaining an IP address is declared and the appropriate security measures taken, e.g., the request is not forwarded to the DHCP server and security personnel are notified of the fraud.

Numerous additional embodiments, features and applications for the methods and apparatus of the present invention are discussed in the detailed description that follows.

DETAILED DESCRIPTION

Figure 1:
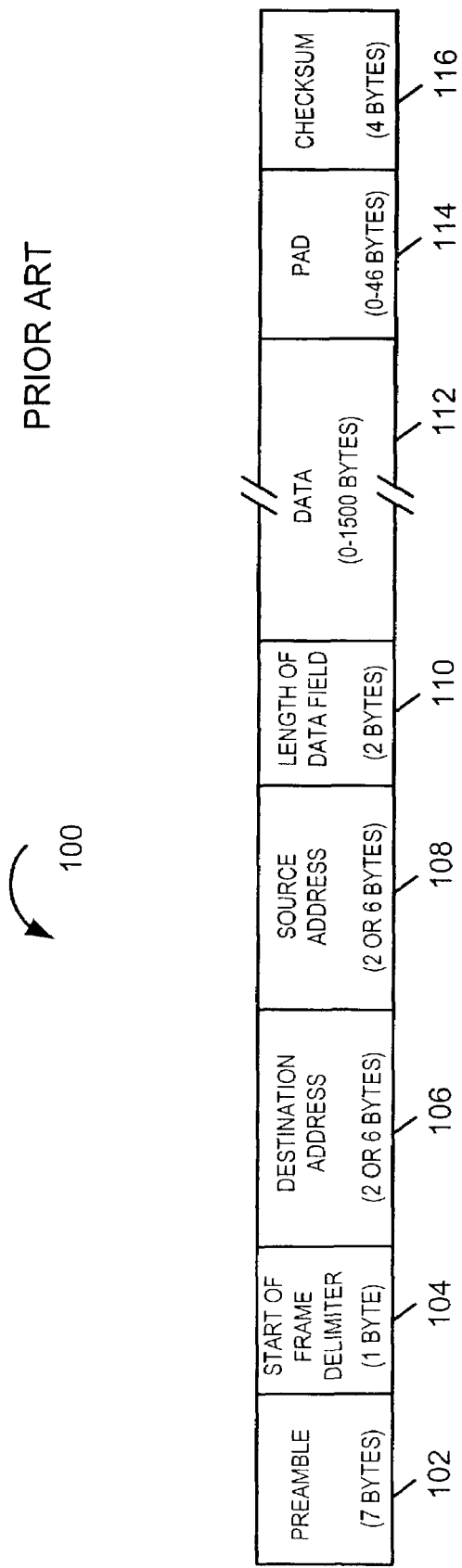
FIG. 1 illustrates an Ethernet frame.
Figure 2:
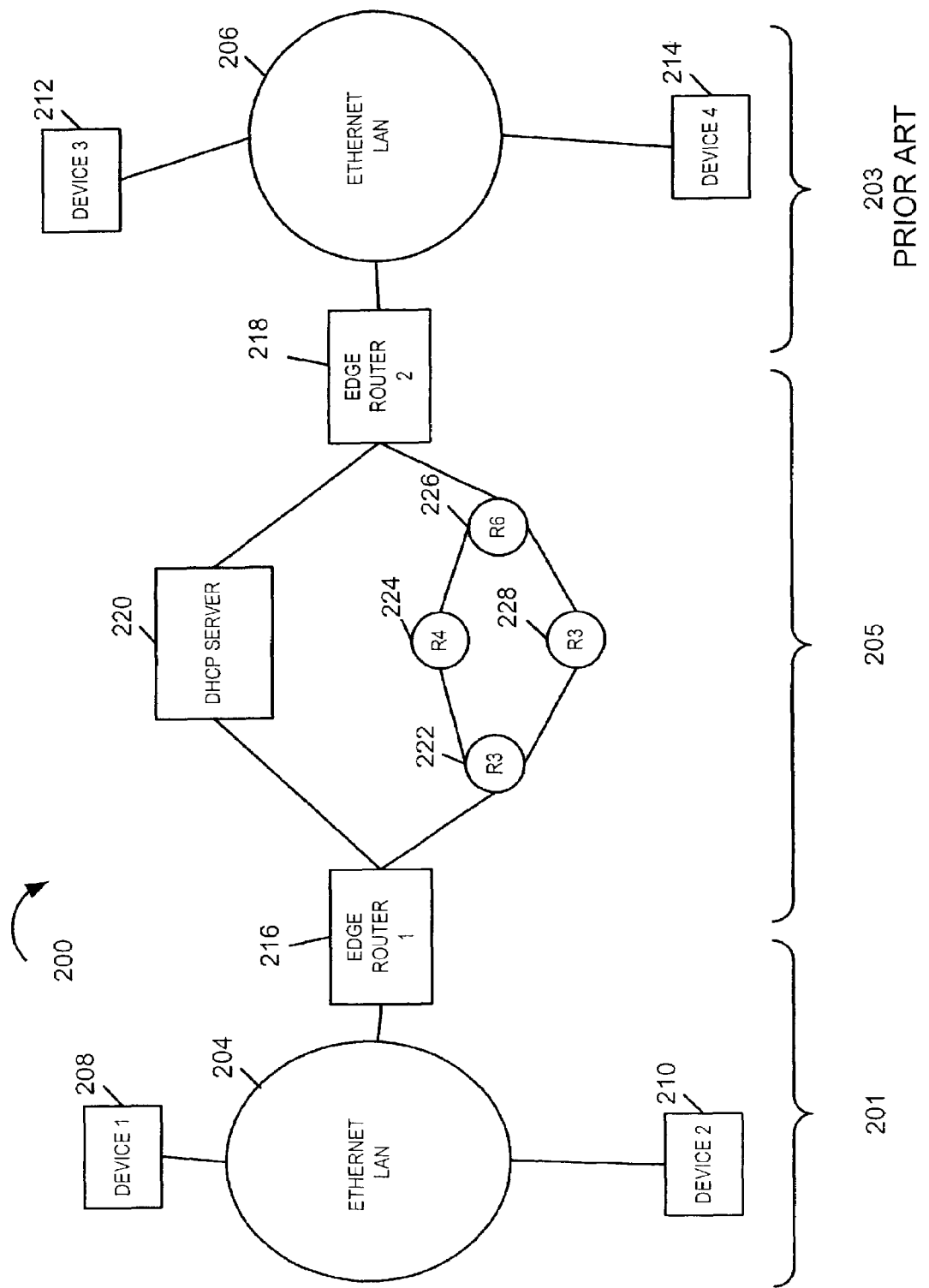
FIG. 2 is a simplified Internet diagram.
Figure 3:
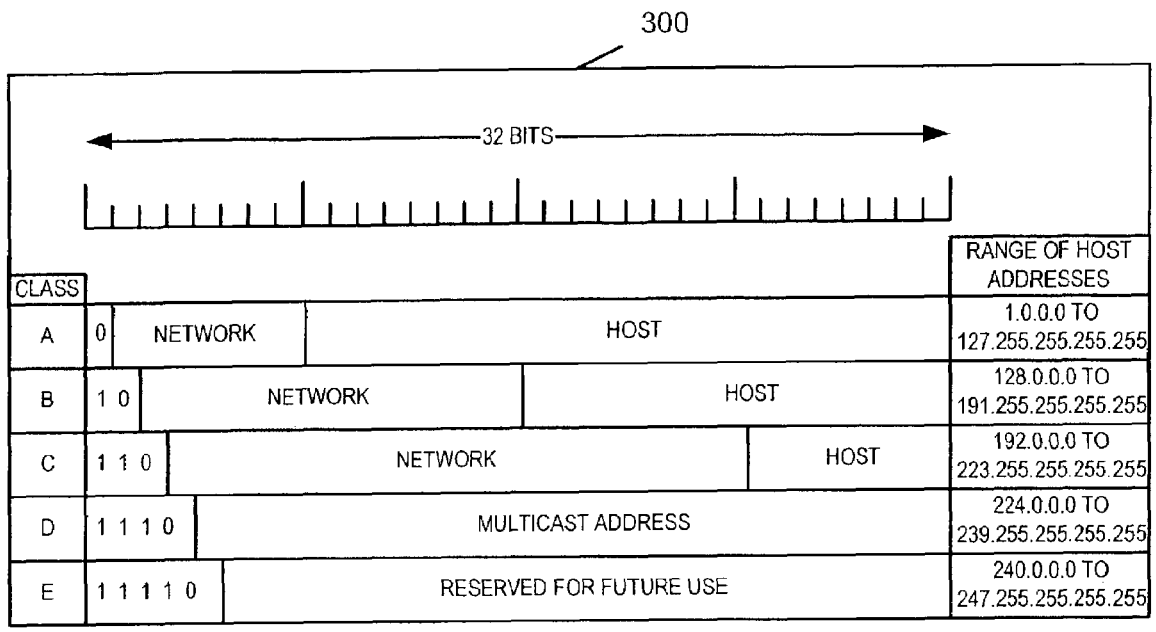
FIG. 3 illustrates the 32 bit IP addressing scheme used for Internet addresses.
Figure 4:
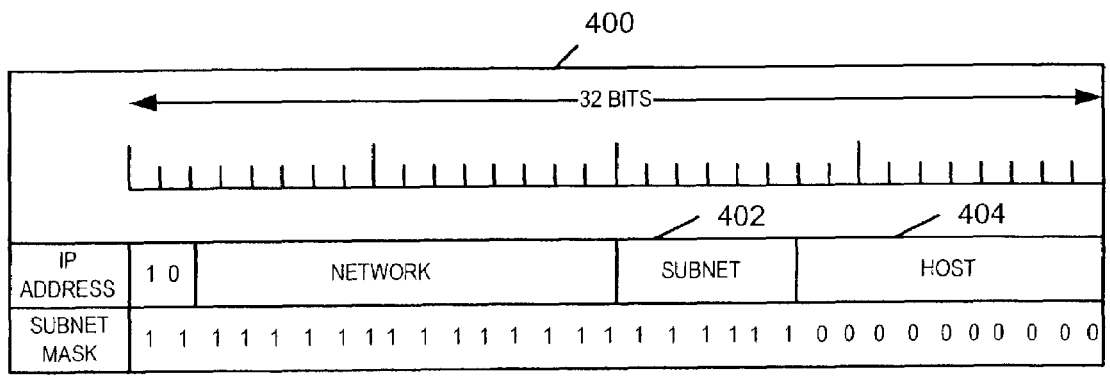
FIG. 4 illustrates the components of a 32 bit Internet address having the illustrated subnet mask.
Figure 5:
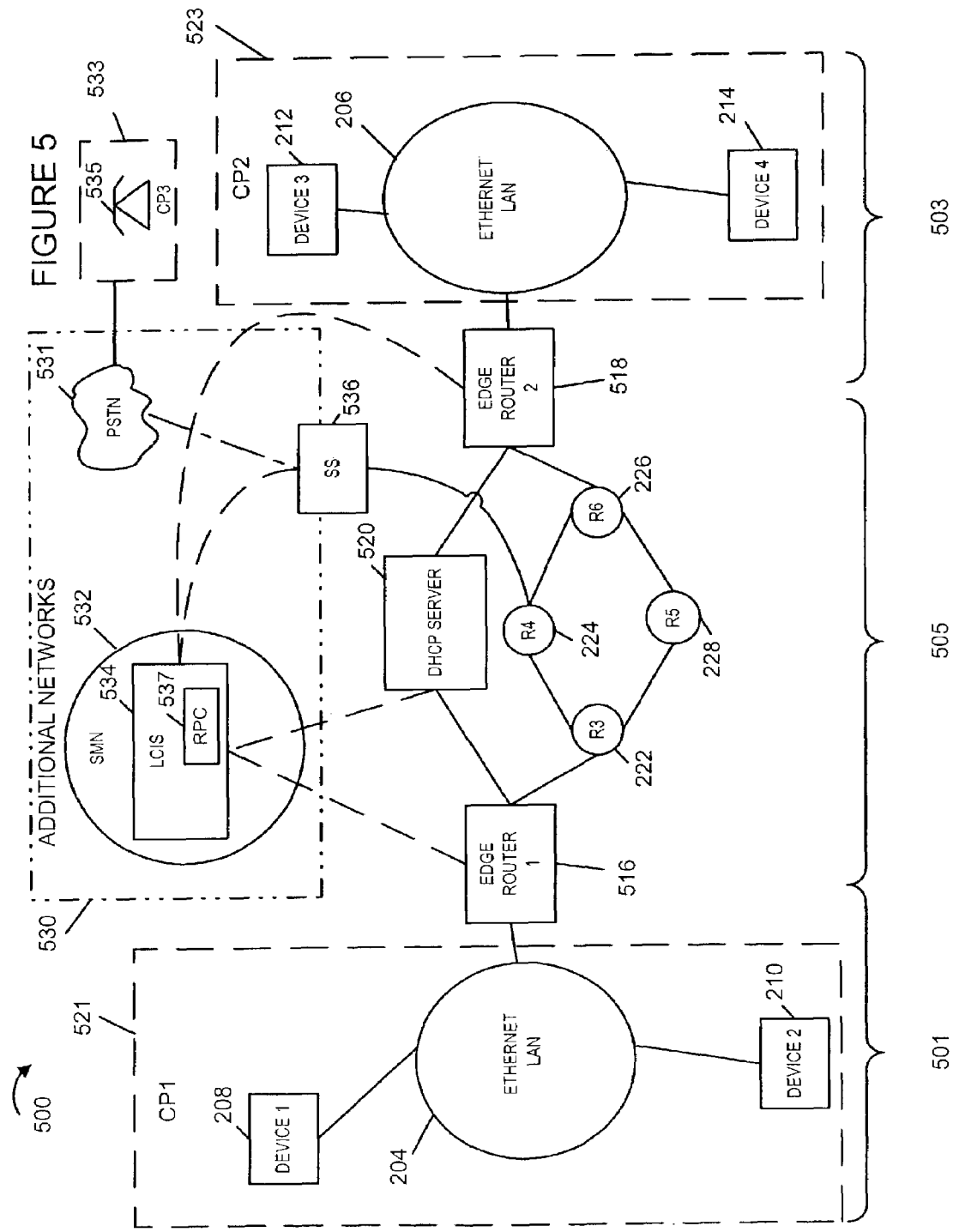
FIG. 5 illustrates a communications system implemented in accordance with the invention.

FIG. 5 illustrates a communication system 500 implemented in accordance with the present invention. As will be apparent from a review of FIG. 5, the communication system 500 has many elements which are the same as or similar to the elements of the existing Internet as shown in FIG. 2. Elements in FIG. 2 and FIG. 5 which are the same as, or similar to, one another are indicated using the same reference numbers in both figures. Such elements will not be described again in detail.

The system illustrated in FIG. 5 includes first and second Layer 2 networks 501, 503, e.g., Ethernet LANs, coupled together by a Layer 3, e.g., IP based, network 505. In addition to the IP based network 505, the system 500 includes additional networks 530. The additional networks include a service management network (SMN) 532 and a public switched telephone network 531. One or more conventional (e.g., non-IP) telephone devices may be coupled to the PSTN 531. In FIG. 5, for purposes of illustration, a single telephone 535, located at a customer premise 531, is shown coupled to the PSTN 531. In reality many such telephone devices located at different customer premises are coupled to the PSTN 531.

The first Layer 2 network, e.g., LAN 501, includes host devices 208, 210 coupled to Ethernet bus 204. The LAN 501 is located at a first customer premise (CP) 521. Similarly, the second Layer 2 network 503 including host devices 212, 214 coupled to Ethernet bus 206. The LAN 503 is located at a second CP 523. Each CP 521, 523, corresponds to a single physical location, e.g., an office building or home, for which location information can be stored in the SMN 532.

An IP based network 505 couples the first and second Layer 2 networks 501, 503 together. The IP based network 505 includes first and second edge routers 516, 518, a DCHP server 520, core routers 222, 224, 226, 228 and a soft switch (SS) 536.

The first and second edge routers 516, 518 serve as the interface between the Ethernet LANs 501, 503, respectively, and the IP 505. While the edge routers 516, 518 perform the same functions as edge routers 216, 218 as will be discussed further below, they also include routines for responding to requests to identify a router port corresponding to an IP or MAC address supplied as part of a port information request.

The DHCP server 520 is responsible for dynamically assigning IP addresses while the SS 536 is responsible for interfacing between the IP network 505 and public switched telephone network (PSTN) 531. The soft switch stores information associating IP address of telephone devices with telephone numbers. It is responsible for routing IP telephone calls between IP telephone devices over the IP network 505 and for performing the necessary protocol conversions required to bridge and route telephone calls between the IP domain and the PSTN 531. Routing of telephone calls between the IP and PSTN domains may be required, e.g., when a telephone call between an IP device and a conventional PSTN telephone occurs.

To facilitate the secure exchange of customer and management information between system components, e.g., routers and servers in the system 500, the system 500 includes a secure management network (SMN) 532. The SMN 532, which may be implemented using IP, is in addition to the Layer 3 network 505.

As an alternative to using a separate network for the exchange of management and customer information, secure communications channels can be implemented between system components, e.g., routers and servers, using encryption and/or other virtual private networking techniques. Accordingly, customer and management information may be transmitted over separate physical communications channels or secure communications channels provided by using existing communications links between network elements.

Various elements are incorporated into the SMN 532 including a location and customer information server (LCIS) 534 implemented in accordance with the invention. As will be discussed below, in accordance with the present invention, the LCIS 534 includes a router-port to customer information (RPC) database 537. The RPLC database 537 includes sets of customer records created, e.g., when a customer subscribes to an IP service provider. As will be discussed below each record may include, e.g., customer premise location information, name, address and land-line telephone number information. Each customer record is correlated to an edge router and port which is assigned to be used by the customer when accessing the IP network via a LAN or other connection.

For various applications, e.g., servicing of 911 emergency telephone calls, the SS 536 and/or other network devices coupled to the SMN 532 may request the location and/or other customer information associated with a particular IP address of interest, e.g., the IP address used to initiate a 911 calls from an IP telephone. As will be discussed below, the LCIS 534 includes routines for responding to such information requests.

Figure 6:
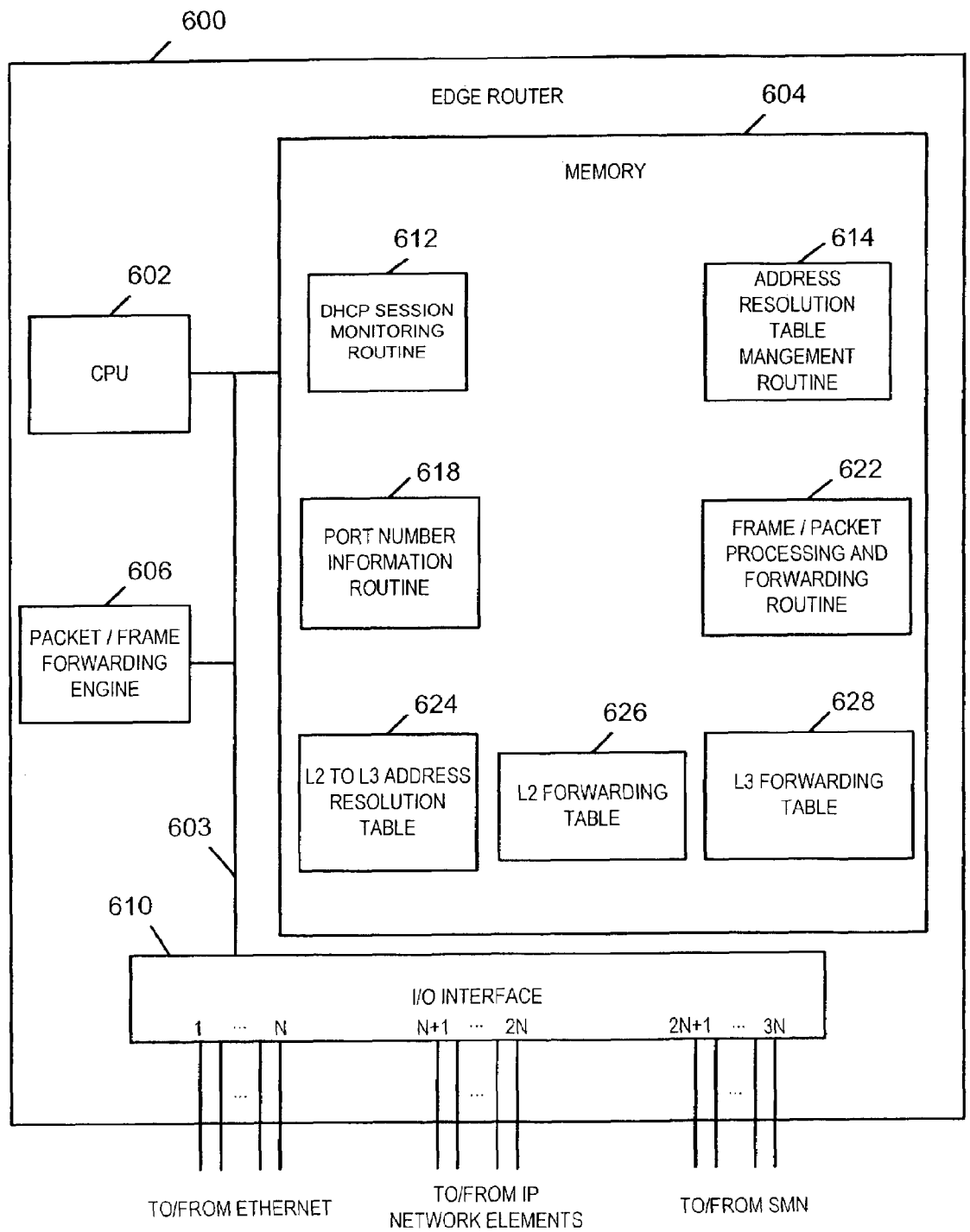
FIG. 6 illustrates an edge router implemented in accordance with the invention.

FIG. 6 illustrates an edge router 600 which may be used as any one of the edge routers 516, 518 of the system illustrated in FIG. 5. As illustrated, the edge router 600 includes a CPU 602, packet/frame forwarding engine 606, memory 704 and I/O interface 610 which are coupled together by a bus 603. The I/O interface 610 includes a plurality of ports used to connect the edge router 600 to various networks. Ports 1 through N are used to couple the router 600 to one or more Ethernet LANs. Ports N+1 through 2N are used to connect to elements of the IP network 505, e.g., DHCP server 520 and router R3 522 or R6 526, while Ports 2N+1 through 3N are used to coupled the edge router 600 to the SMN and thus the LCIS 534 included therein.

The memory 604 includes an L2 forwarding table 626, an L3 forwarding table 628, an L2 to L3 address resolution table 624, a frame/packet processing and forwarding routine 622, a DHCP session monitoring routine 612, address resolution table management routine 614, and port number information routine 618.

The Layer 2 forwarding table 626 includes information used for forwarding received Ethernet frames according to the MAC destination address specified in the frame's header.

Figure 7:
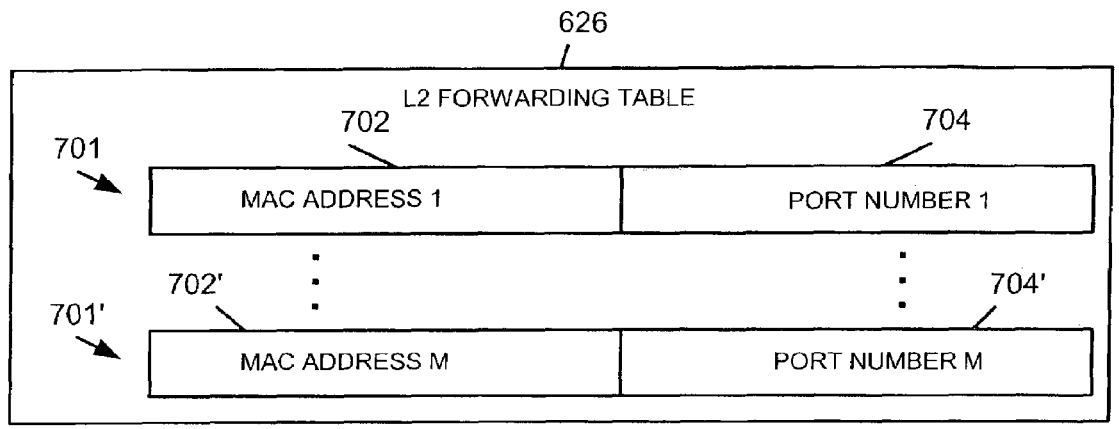
FIGS. 7-9 illustrate various tables included in the edge router of FIG. 6.

FIG. 7 illustrates an exemplary L2 forwarding table 626. The table includes a plurality of entries 701, 701'. Each entry includes a MAC address 702, 702' and a port number 704, 704'. Under direction of the forwarding routine 622, frames received by the edge router having a MAC address listed in the L2 forwarding table are output using the port 704, 704' corresponding to the destination MAC address. In this manner Ethernet frames are forwarded in the Layer 2 domain based on MAC destination addresses.

Figure 8:
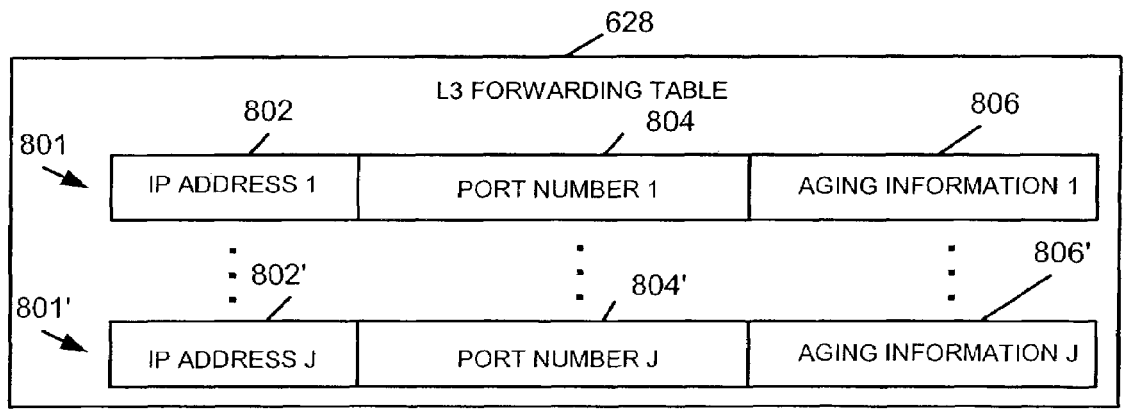

The Layer 3 (L3) forwarding table 628 is used by the router 600 to forward IP packets in the IP domain. As illustrated in FIG. 8, the L3 forwarding table includes a plurality of entries 801, 801'. Each entry includes an IP address 802, 802', a port number 804, 804' and aging information 806, 806'. The aging information is used to determine when an entry 801, 801' should be deleted from L3 forwarding table as part of a table maintenance operation. Under direction of the forwarding routine 622, IP packets received by the edge router 600 having a MAC address listed in the L2 forwarding table are output using the port 804, 804' corresponding to the destination IP address. In this manner IP packets are forwarded in the Layer 3 domain based on IP addresses.

Figure 9:
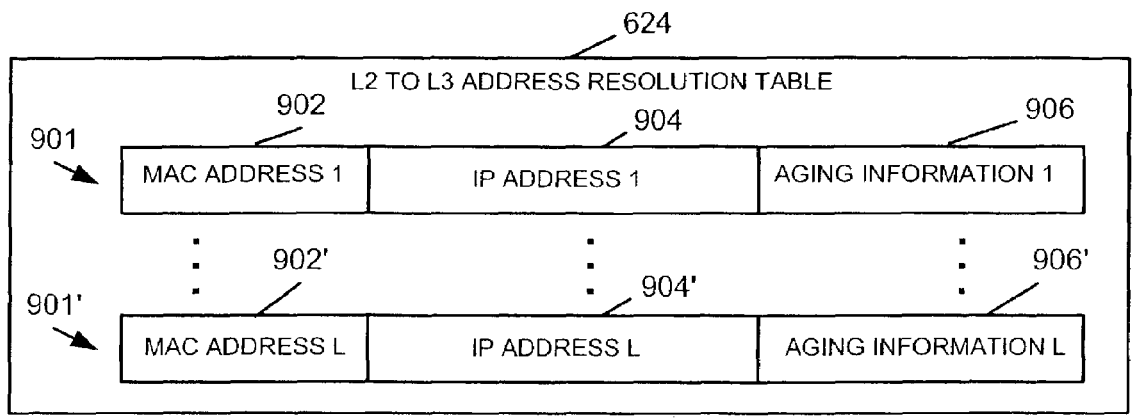

The L2 to L3 address resolution table 624, shown in FIG. 9, is used for converting between Layer 2, e.g., MAC, addresses and Layer 3, e.g., IP, addresses. The L2 to L3 address resolution table 624 includes a plurality of entries 901, 901'. Each entry includes a MAC address 902, 902', an IP address 904, 904' and aging information 906, 906'. As in the case of the L3 forwarding table 628, the aging information 906, 906' is used for table maintenance purposes.

When an IP packet is received which has a destination address not found in the L3 forwarding table 628, the forwarding routine 622 compares the received IP destination address to the entries in the L2 to L3 resolution table 624. If the IP address is listed in the table 624, the MAC address 902 or 902' corresponding to the received destination IP address 904 or 904', respectively, is retrieved from the L2 to L3 address resolution table. The MAC address is then used in a L2 forwarding table look-up operation. Using the MAC address as an index to the L2 forwarding table, an output port to be used for forwarding the information included in the received IP packet is determined. As part of the forwarding operation, content from the received IP packet is placed into the payload of an Ethernet frame and then transmitted to the appropriate Ethernet LAN via the port identified in the L2 forwarding table. In this manner, IP packets received from the IP network can be transmitted to devices over the Ethernet LAN coupled to the edge router 600.

In accordance with one feature of the invention, as an alternative to using address resolution protocol (ARP), the DHCP monitoring routine 611 snoops DCHP sessions between devices on the Layer 2 network, e.g., devices 208, 210 and the DHCP server 220. In this manner, the monitoring routine 611 obtains information on the assignment of IP addresses to devices and the release of IP address by devices. This information is conveyed to the address resolution table management routine 614 which updates the layer 2 to layer 2 (L2 to L3) address resolution table 624.

Address resolution table management routine 614 is responsible for removing, e.g., deleting, entries from the L2 to L3 address resolution table 624 and/or L3 forwarding table, after an entry has aged for a preselected period of time as indicated from the aging information stored for each entry. Alternatively, in the case where DCHP sessions are snooped in accordance with one feature of the invention, entries are deleted from tables 624 and 628 when the IP lease time expires, a device releases an IP address, or a device fails to respond to a DHCP status inquiry. Thus, in such an embodiment, IP address entries are added to and deleted from tables 624, 628 based on information obtained from snooping communications between host devices on a layer 2 LAN coupled to the edge router 600 and the DHCP server 220.

Port number information routine 618 responds to port number information requests received by the edge router 600 by returning the port number corresponding to an IP address or MAC address received in a port number information request.

The routine 618 first determines whether an IP or MAC address has been received in a port number information request. If the request includes a MAC address, the received MAC address is used as an index into the L2 forwarding table to determine the router port corresponding to the received address. If an IP address is received as part of a port number information request, the IP address is first used as an index as part of a look-up into the L2 to L3 address resolution table 624. In this manner the MAC address corresponding to the received IP address is determined from the table 624. Once the MAC address is determined from table 624 it is used to consult the L2 forwarding table 626. In this manner, the router port corresponding to the MAC address is determined.

The router port number determined by port number information routine 618 is returned to the device which sent the router 600 a port number information request. In the case of a port number information request from the LCIS 534, the determined port number would normally be returned via the secure SMN 532 via which the request was received by the edge router 600.

Figure 10:
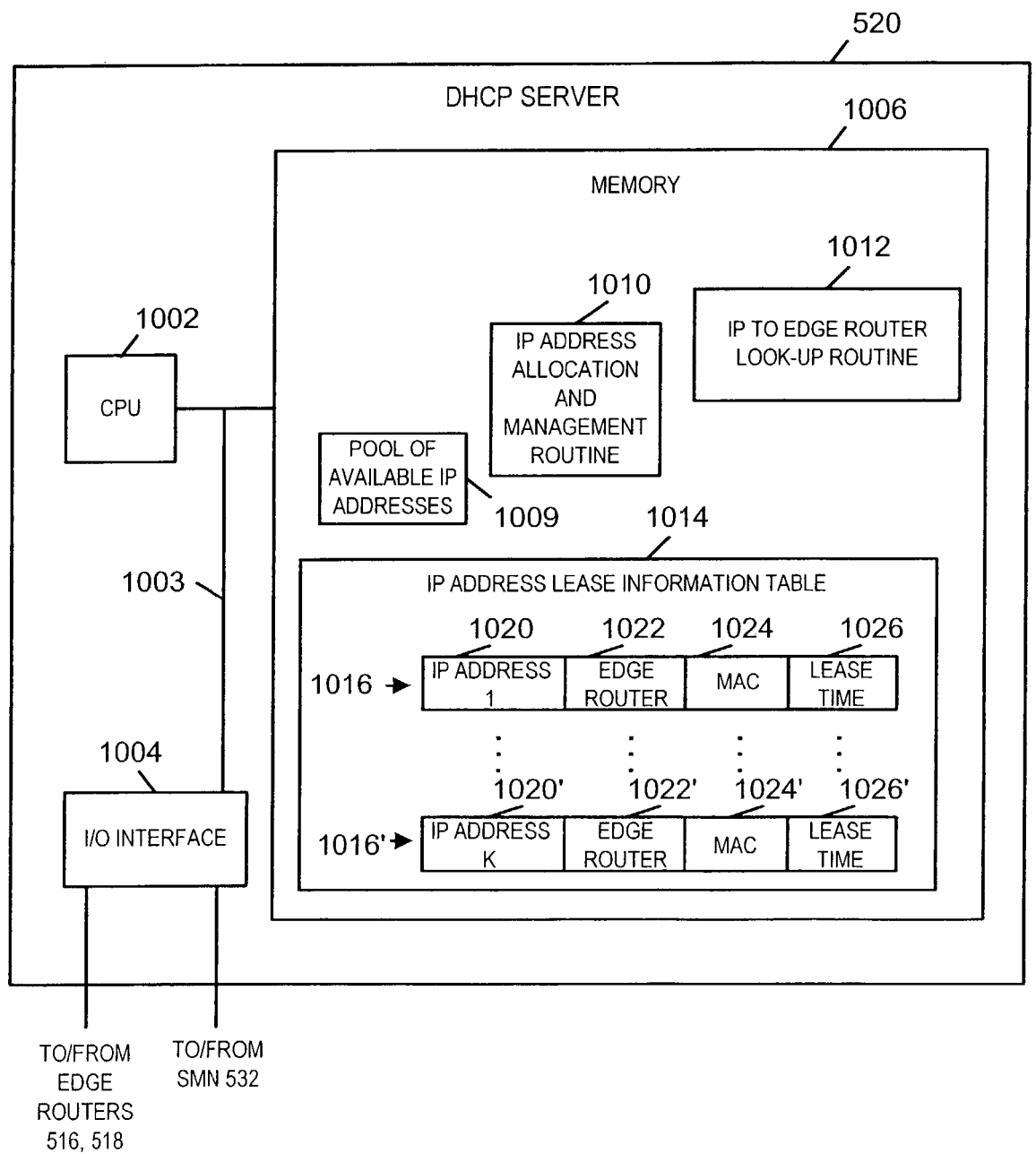
FIG. 10 illustrates a DHCP server responsible for dynamically assigning IP addresses and for storing information relating to said addresses in accordance with the present invention.

FIG. 10 illustrates a DHCP server 520 implemented in accordance with the present invention. As illustrated, the DHCP server 520 includes a CPU 1002, I/O interface 1004 and memory 1006 which are coupled together by bus 1003. The memory 1006 includes an IP address allocation and management routine 1010, IP to edge router and optionally MAC address look-up routine 1012, a pool of available IP addresses 1009, and an IP address lease information table 1014. The pool of available IP addresses 1009 is a list of unused IP addresses which the DHCP server 520 is authorized to lease to requesting devices. In accordance with the invention, the table 1014 is used to manage leased IP addresses and as an IP to edge router (IP2ER) look-up table for providing information on the edge router associated with an IP address.

When a device on a LAN, e.g., device 208 on LAN 204, needs an IP address so that it can access the IP network 505 it broadcasts an IP address assignment request. The request is detected by the edge router on the LAN, e.g. router 216. The edge router 516 responds by acting as a proxy of the requesting device 208 and initiating a DHCP session with the DHCP server 520.

This may be done as is known in the art using DHCP protocol. An IP address assignment request conveyed to the DHCP server 520 includes the MAC address of the requesting device. In response to an IP address assignment request, the DHCP server 520 assigns the requesting device 208 an available IP address from the pool 1009. In addition the server 520 removes the address from the pool 1009 and creates a new entry 1016 in the IP address lease information table 1014.

Each entry 1016, 1016' in the table 1014 includes the IP address assigned 1020, 1020', the edge router 1022, 1022' acting as proxy for the requesting device, the MAC address 1024, 1024' of the device to which the IP address was assigned, and lease time information 1026, 1026'. The lease time information 1026, 1026' indicates the term, e.g., duration, of the IP address lease and other lease related information. One entry 1016 or 1016' exists in the table 1014 for each IP address leased to a device by the DHCP server 520. In the exemplary embodiment of FIG. 10, the table 1014 includes entries for K leased IP addresses 1620 through 1620'.

When an IP address is assigned, i.e., leased, to a requesting device, the IP address and lease time information (indicating the duration of the lease) is communicated back to the requesting device by way of the edge router acting as the device's proxy.

Accordingly, as part of the DHCP server IP address leasing mechanism, a table 1014 associating assigned IP addresses with information identifying the edge router used by the device assigned the IP address to access the IP network 505 and the devices MAC address.

Edge router information requests, e.g., requests from the LCIS 534, may be received by the DHCP server 520 via SMN 532. IP to edge router look-up routine 1012 is responsible for responding to such requests by correlating an edge router to an IP address received in the information request. To determine the edge router corresponding to an information request, the look-up routine 1012 accesses the IP address lease information table 1014 using the received IP address as an index into the table. In this manner, the look-up routine 1012 retrieves the information 1022, 1022' identifying the edge router corresponding to the received IP address. In some embodiments, the routine 1012 also recovers from the table 1014, the MAC address corresponding to the received IP address. The information identifying the edge router, and, optionally, the MAC address, corresponding to a received IP address is returned to the device, e.g., LCIS 534, which sent the edge router information request to the DHCP server. In this manner, devices such as the LCIS can obtain from the DHCP server information identifying the edge router being used by a device having a specific IP address.

Figure 11:
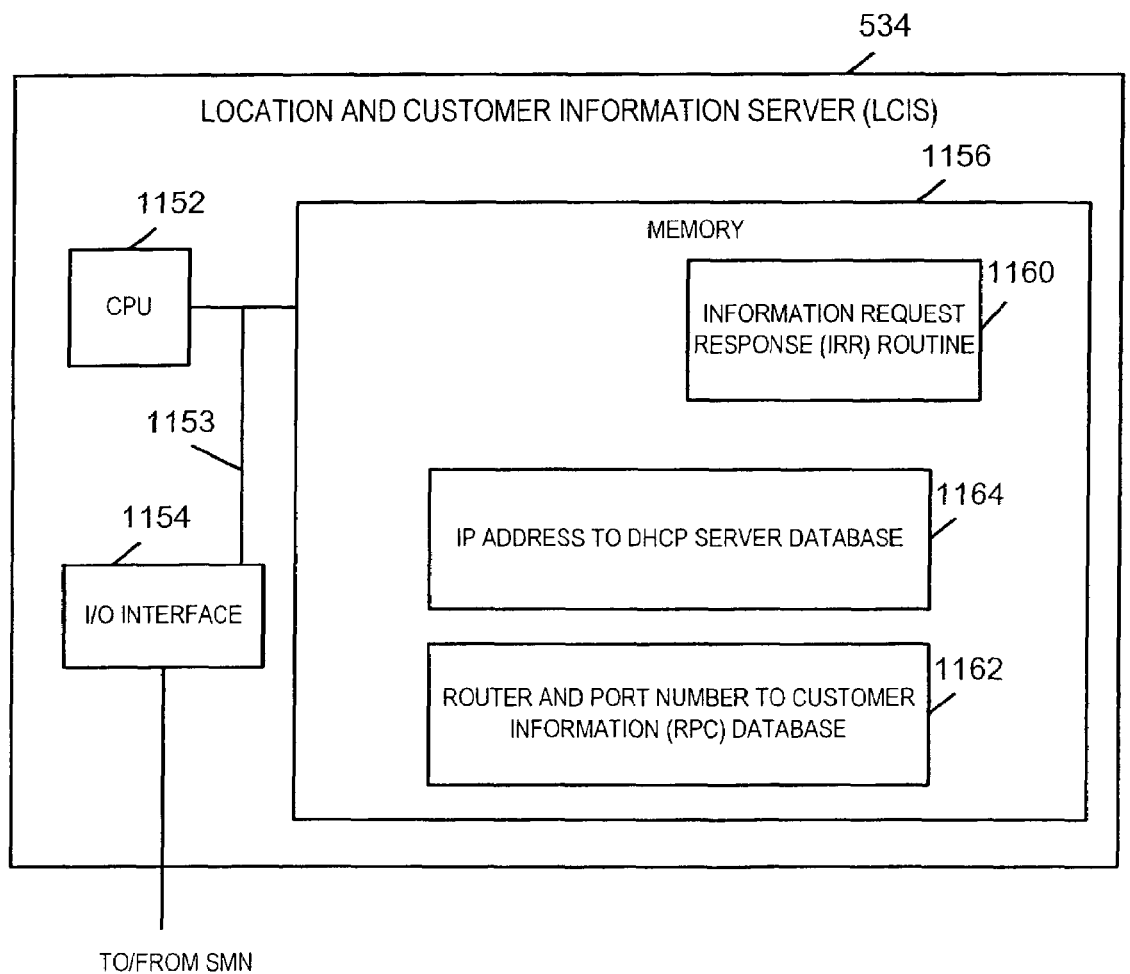
FIG. 11 illustrates a location and customer information server (LCIS) implemented in accordance with the invention.

FIG. 11 illustrates a location and customer information server (LCIS) 534 implemented in accordance with the invention. For security reasons, the LCIS 534 is implemented as part of the SMN 532. However, it could, alternatively, be implemented as a device on the IP network 505 assuming sufficient security measures are taken, e.g., the use of a firewall and/or data encryption, to protect the server and its contents from unauthorized access and/or tampering.

The LCIS 534 includes a central processing unit 1152, I/O interface 1154 and memory 1156 which are coupled together by bus 1153. The CPU 1152 controls operation of the LCIS under direction of one or more routines stored in memory 1156. The I/O interface 1154 couples the internal components of the LCIS 534 to external devices via the communications links of the SMN 532. For example, in the FIG. 5 embodiment, the LCIS 534 is coupled to the edge routers 516, 518, SS 536 and DHCP server 520 via communications links of the SMN 532.

The memory 1156 includes an IP address to DHCP server database 1164, and an edge router and port number to customer information (RPC) database 1162, and an information request response routine 1160.

The IP address to DHCP server database 1164, includes information correlating IP addresses which may be assigned by DHCP servers to particular DCHP servers in the IP network. Thus, the LCIS 534 is able to determine which DHCP server 520, out of a plurality of such servers, to contact for information regarding an IP address received as part of an information request.

The RPC database 1162 includes information correlating specific edge routers and ports to customer information including, e.g., physical location, name and land line telephone number information.

Figure 12:
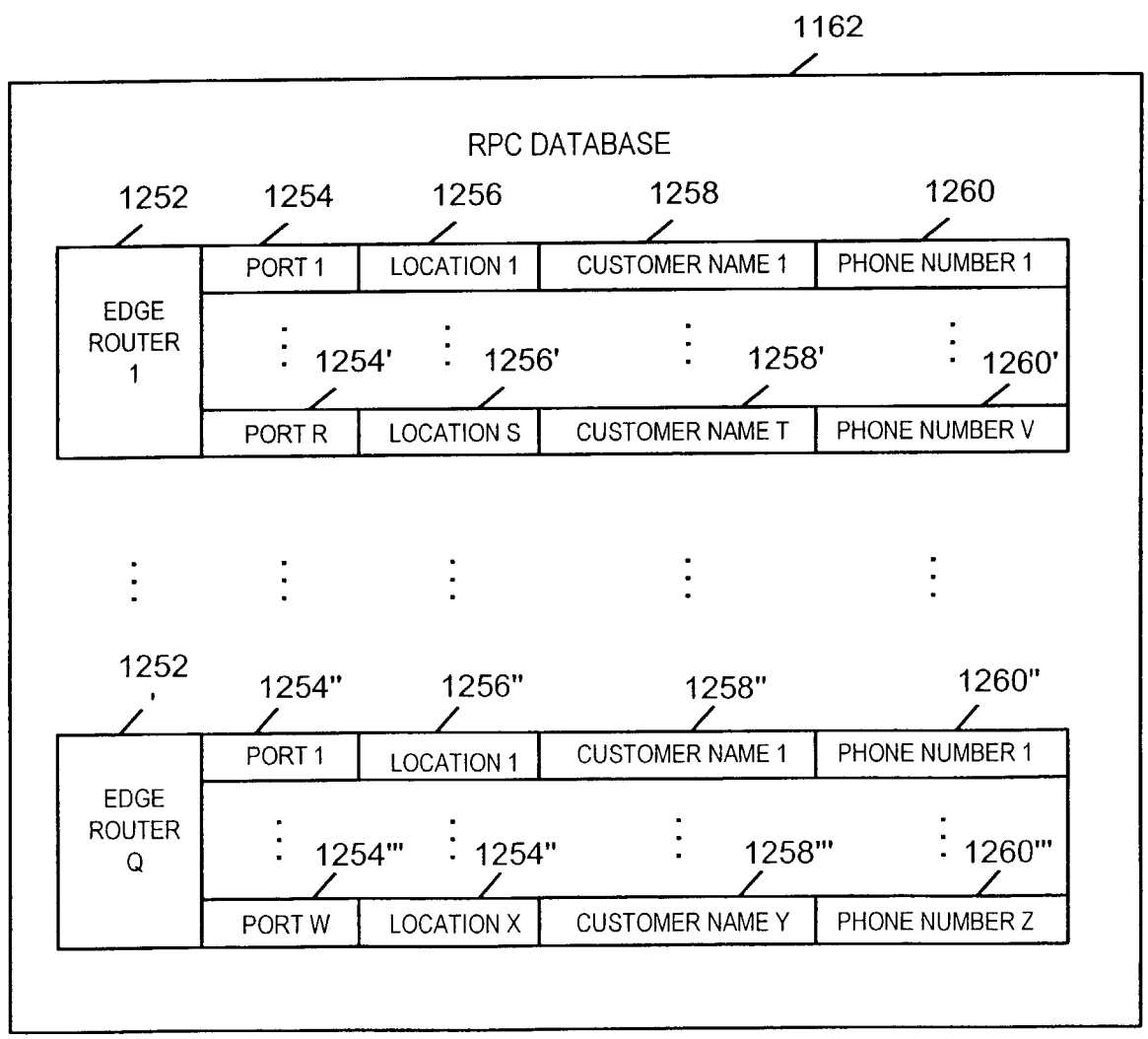
FIG. 12 illustrates a router and port number to customer (RPC) information database implemented in accordance with the invention.

FIG. 12 illustrates an exemplary RPLC database 1162. As illustrated the exemplary database includes Q records one record corresponding to each of Q edge routers. Each record includes a router identifier 1252, 1252' and a set of entries corresponding to particular router ports. Each router port entry includes a port identifier 1254, a location identifier 1256, customer name information 1258 and telephone number information 1260. The location information is the location of the customer premise, e.g., physical LAN location, from which the customer may access the IP network via the identified router and port. The phone number 1260 is the telephone number of a landline phone located at the corresponding physical location specified in the edger router/port entry. Additional customer information, e.g. billing, service subscription and level of desired privacy information, may also be included in the RPLC database 1162 for each router/port entry. The RPLC database 1162 is populated as subscribers contract with an IP service provider for IP service and is updated, e.g., periodically, to reflect changes in the customer information and/or the cancellation or modification of service.

The information request response routine (IRR) 1160 responds to requests for location and/or other customer information corresponding to an IP address. The IP address of interest and, optionally, the desired type of information, is included in an information request. Such information requests may come from a variety of sources, e.g., routers and/or servers implementing security routines, soft switch 536, etc.

Figure 13:
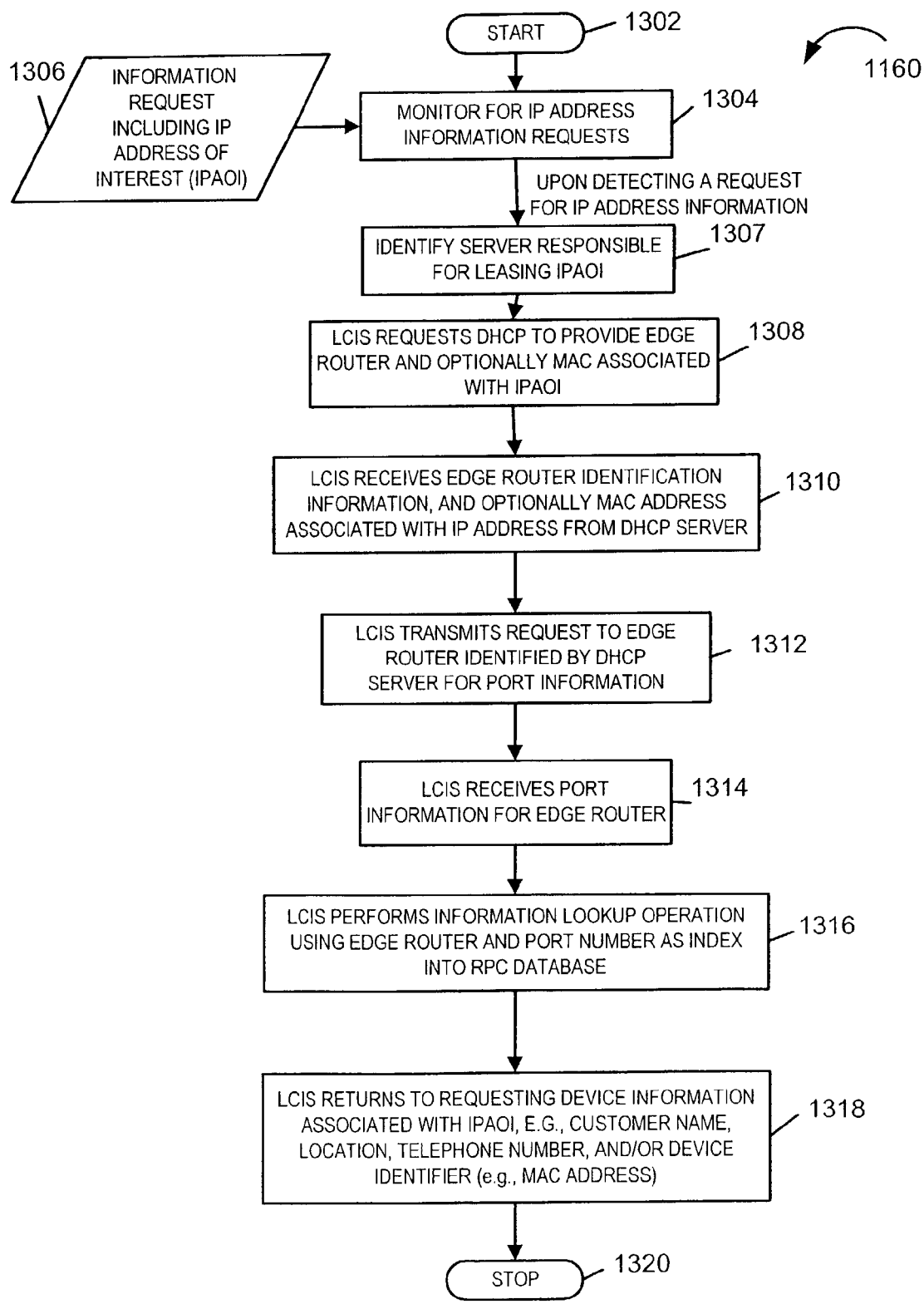
FIG. 13 illustrates a routine for providing customer information corresponding to an IP address in response to information requests.

An exemplary IRR routine 1160 will now be discussed with reference to FIG. 13. The IRR routine 1160 begins in step 1302 where it is executed by the CPU 1152, e.g., when the LCIS 534 is activated. Then in step 1304 the routine 1160 monitors for an information request 1306 including an IP address of interest (IPAOI). For each such detected IP address information request, operation proceeds to step 1307.

In step 1307 the LCIS 534 identifies, e.g., by querying its IP address to DHCP server database 1164, the DHCP server responsible for leasing the IPAOI to a device. Then, in step 1308, the LCIS 534 sends a message, including the IPAOI, to the identified DHCP server requesting information, e.g., edge router and MAC address information, corresponding to the IPAOI.

In step 1310, in response to the information request sent to the DHCP server, the LCIS 534 receives edge router identification information and, in some embodiments, the MAC address of the device to which the IPAOI was leased. Then in step 1312, the LCIS 534 transmits a request to the edge router identified by the DHCP server for port information relating to the IPAOI. The port number information request transmitted to the identified edge router includes, when available, the MAC address received from the DHCP server in addition to, or instead of, the IPAOI.

In response to the port information request message, in step 1314, the LCIS 534 receives from the contacted edge router, the edge router port number corresponding to the supplied IPAOI or MAC address. Then, in step 1316, the LCIS 534 accesses the RPLC database 1162 using the router and port number corresponding to the IPAOI to retrieve therefrom the requested location and/or customer information determined to correspond to the IPAOI.

Once the desired information, e.g., customer name, location, telephone number is retrieved from the RPLC database, in step 1318 it is returned to the device which requested information corresponding to the IPAOI. The MAC address may also be returned to the requesting device where device identification information is desired.

Once the requested information corresponding to the IPAOI has been transmitted to the requesting device, e.g., over the secure SMN 532, processing of the received IP address information request stops in step 1320. However, the monitoring operation of step 1304 and processing of other IP address requests will continue until the routine 1160 is terminated, e.g., by the LCIS 534 being turned off or shut down.

Various additional embodiments will be apparent to those skilled in the art in view of the above description. For example, rather than return location and/or other customer information, in cases where only reliable device identification information is required, the LCIS could return, e.g., the MAC address corresponding to an IPAOI, without the other customer information. Such an embodiment would be useful e.g., in cases where services were to be limited to specific physical devices.

Accordingly, it is to be understood that numerous variations on the above described methods and apparatus are possible without departing from the scope of the invention.

What is claimed is:

1. A method of providing information related to an IP address used by a customer used in an IP network including edge routers and a node different from the edge routers, the method comprising operating said node to perform the steps of:

identifying an edge router in said IP network corresponding to said IP address, the step of identifying an edge router including using said IP address to access information correlating IP addresses to at least one edge router used to access the IP network;

retrieving, from the identified edge router, port information indicating a router port corresponding to the said IP address; and retrieving from a customer information database including router port identifiers and a set of customer information corresponding to each router port identifier, customer information corresponding to the port identified by the retrieved port information.

2. The method of claim 1, further comprising when a customer subscribes for IP network service:

assigning an edger router port to be used by said customer when accessing the IP network from a specific customer premise location;

creating an entry in said customer information database associating the assigned edge router port with information corresponding to said customer.

3. The method of claim 2, wherein creating an entry includes:

storing customer premise location information in said customer information database.

4. The method of claim 3, wherein creating an entry further includes:

storing a telephone number of a telephone located at said specific customer premise location.

5. The method of claim 4, wherein creating an entry further includes:

storing the name of the customer.

6. The method of claim 5, wherein creating an entry further includes storing information about communications services to which the customer subscribes.

7. The method of claim 3, wherein creating an entry includes storing in said customer information database at least one of: customer premise location information; a telephone number of a telephone located at said specific customer premise location; and a name of the customer.

8. The method of claim 1, wherein said step of identifying an edger router further includes:

identifying a network device responsible for leasing said IP address.

9. The method of claim 8, wherein said network device responsible for leasing said IP address is a DHCP server.

10. The method of claim 8, wherein the information correlating IP addresses to edge routers is a database including IP address lease information and a layer 2 network address of each device to which an IP address is leased.

11. The method of claim 10, further comprising the step of:

identifying a layer 2 network address of a device to which said IP address was leased.

12. The method of claim 1, wherein retrieving, from the identified edge router, port information includes:

using the identified layer 2 network address to access a table correlating port numbers to layer 2network addresses.

13. The method of claim 12, wherein the layer 2 network address is a MAC address.

14. The method of claim 1, wherein the step of retrieving from the identified edger router, port information, includes the step of:

transmitting a port number information request over a secure communications channel to the identified edger router.

15. A communications system comprising:
a customer information database including, a plurality of router port identifiers and associated customer records, each router port identifier identifying a router port which can be used by a customer to access an IP network, one of said customer records being associated in said database with each of the plurality of router port identifiers;
a set of information correlating IP addresses used by a customer to at least one edge router; and
an edger router, the edge router including:
  i. at least one port for which a router port identifier is present in said database; and
  ii. means for providing edge router port information in response to a request for said port information from a node outside a Layer 2network which includes the edge router.

16. The system of claim 15, wherein each customer record includes customer premise location information.

17. The system of claim 16, wherein each customer record further includes a telephone number of a telephone located at said specific customer premise location.

18. The system of claim 17, wherein each customer record further includes information about at least one communication service to which the customer subscribes.

19. The system of claim 15, wherein each customer record includes at least one of:
customer premise location information; a telephone number of a telephone located at said specific customer premise location; and a name of the customer.

20. The system of claim 19, further comprising:
a server for assigning IP addresses to be used for communications over said IP network, the server including means for updating said set of information correlating IP addresses to at least one edge router when an IP address is assigned to a device by said server.

21. The system of claim 20, wherein said server is a DHCP server.

22. The system of claim 20, further comprising:
a customer information server, including means for accessing said customer information database, the customer information server being coupled to said server for assigning IP addresses and to said edge router by secure communications channels.

23. The system of claim 22, wherein said secure communications channels are links of a management network.

24. The communications system of claim 16, wherein said means for providing edge router port information include:
a layer 2 to port address look-up table.

25. The communications system of claim 24, wherein said means for providing edge router port information further include:
a layer 2 to layer 3 address look-up table.

26. The communications system of claim 15, wherein the Layer 2 network is an Ethernet network.

* * * * *